United States Patent
Mesher

(10) Patent No.: US 11,142,230 B2
(45) Date of Patent: *Oct. 12, 2021

(54) BROKEN WHEEL DETECTION SYSTEM

(71) Applicant: TETRA TECH, INC., Pasadena, CA (US)

(72) Inventor: Darel Mesher, Spruce Grove (CA)

(73) Assignee: TETRA TECH, INC., Pasadena, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/940,505

(22) Filed: Jul. 28, 2020

(65) Prior Publication Data
US 2020/0369302 A1    Nov. 26, 2020

Related U.S. Application Data

(63) Continuation of application No. 16/594,231, filed on Oct. 7, 2019, now Pat. No. 10,723,373, which is a
(Continued)

(51) Int. Cl.
*B61L 3/00* (2006.01)
*B61L 23/00* (2006.01)
(Continued)

(52) U.S. Cl.
CPC .......... *B61L 23/00* (2013.01); *B61L 27/0077* (2013.01); *B61L 27/0094* (2013.01);
(Continued)

(58) Field of Classification Search
CPC ......... G06T 7/001; G06T 7/70; G06T 7/0004; G06T 7/521; G06T 2207/30164;
(Continued)

(56) References Cited

U.S. PATENT DOCUMENTS 3,764,192 A * 10/1973 Wheeler ................... H04N 3/09
359/206.1
3,829,192 A * 8/1974 Wheeler ................... H04N 3/09
250/338.1
(Continued)

FOREIGN PATENT DOCUMENTS

DE    19831176    1/2000
DE    19831215    1/2000
(Continued)

OTHER PUBLICATIONS

Notification of Transmittal of the International Search Report and the Written Opinion of the International Searching Authority, PCT International Application No. PCT/US2018/19138 (dated May 1, 2018).
(Continued)

*Primary Examiner* — Philip P. Dang
(74) *Attorney, Agent, or Firm* — Robinson IP Law, PLLC

(57) ABSTRACT

A broken wheel detection system for detecting broken wheels on rail vehicles even when such vehicles are moving at a high rate of speed by determining the positions, lengths, or orientations of structured light lines projected against passing wheels.

14 Claims, 14 Drawing Sheets

Related U.S. Application Data continuation of application No. 15/902,465, filed on Feb. 22, 2018, now Pat. No. 10,435,052.

(60) Provisional application No. 62/461,865, filed on Feb. 22, 2017.

(51) Int. Cl.

| | | |
|---|---|---|
| *H04N 5/225* | (2006.01) | |
| *G06T 7/00* | (2017.01) | |
| *G06T 7/521* | (2017.01) | |
| *G06T 7/70* | (2017.01) | |
| *G01M 17/10* | (2006.01) | |
| *G01B 11/25* | (2006.01) | |
| *B61L 27/00* | (2006.01) | |
| *G01B 11/245* | (2006.01) | |
| *B61L 9/04* | (2006.01) | |

(52) U.S. Cl.
CPC ............ *G01B 11/245* (2013.01); *G01B 11/25* (2013.01); *G01B 11/2518* (2013.01); *G01B 11/2545* (2013.01); *G01M 17/10* (2013.01); *G06T 7/001* (2013.01); *G06T 7/0004* (2013.01); *G06T 7/521* (2017.01); *G06T 7/70* (2017.01); *H04N 5/2254* (2013.01); *H04N 5/2257* (2013.01); *B61L 9/04* (2013.01); *G06T 2207/10016* (2013.01); *G06T 2207/10028* (2013.01); *G06T 2207/20068* (2013.01); *G06T 2207/30164* (2013.01); *G06T 2207/30236* (2013.01); *H04N 5/2256* (2013.01)

(58) Field of Classification Search
CPC . G06T 2207/10028; G06T 2207/30236; G06T 2207/20068; G06T 2207/10016; G01B 11/2545; G01B 11/2518; G01B 11/245; G01B 11/25; G01M 17/10; H04N 5/2256; H04N 5/2254; H04N 5/2257; B61L 23/00; B61L 27/0094; B61L 27/0077
See application file for complete search history.

(56) References Cited

U.S. PATENT DOCUMENTS

| | | | | |
|---|---|---|---|---|
| 4,134,464 A * | 1/1979 | Johnson | ............... | G01G 19/047 |
| | | | | 177/163 |
| 4,781,060 A | 11/1988 | Berndt | | |
| 5,133,521 A * | 7/1992 | Gutauskas | ............. | B61L 1/166 |
| | | | | 246/169 R |
| 5,247,338 A | 9/1993 | Danneskiold-Samsoe et al. | | |
| 5,333,165 A * | 7/1994 | Sun | ...................... | G01N 23/083 |
| | | | | 378/10 |
| 5,433,111 A | 7/1995 | Hershey et al. | | |
| 5,743,495 A * | 4/1998 | Welles, II | ............. | B61L 23/044 |
| | | | | 246/121 |
| 5,793,492 A | 8/1998 | Vanaki | | |
| 6,166,744 A * | 12/2000 | Jaszlics | ................... | G06T 17/00 |
| | | | | 345/421 |
| 6,262,573 B1 * | 7/2001 | Wojnarowski | ........... | B61K 9/10 |
| | | | | 324/217 |
| 6,357,297 B1 | 3/2002 | Makino et al. | | |
| 6,416,020 B1 | 7/2002 | Gronskov | | |
| 6,421,587 B2 * | 7/2002 | Diana | ................... | B61L 25/023 |
| | | | | 246/122 R |
| 6,490,523 B2 * | 12/2002 | Doner | ................ | B61L 15/0027 |
| | | | | 246/1 R |
| 6,523,411 B1 | 2/2003 | Mian et al. | | |
| 6,665,066 B2 | 12/2003 | Nair et al. | | |
| 6,698,279 B1 | 3/2004 | Stevenson | | |
| 6,768,551 B2 | 7/2004 | Mian et al. | | |
| 6,862,936 B2 | 3/2005 | Kenderian et al. | | |
| 7,082,237 B2 * | 7/2006 | Walker | .................. | G02F 1/2257 |
| | | | | 385/40 |
| 7,208,733 B2 | 4/2007 | Mian et al. | | |
| 7,213,789 B1 | 5/2007 | Matzan | | |
| 7,298,548 B2 | 11/2007 | Mian | | |
| 7,328,871 B2 * | 2/2008 | Mace | ........................ | B61L 1/16 |
| | | | | 246/169 R |
| 7,355,508 B2 | 4/2008 | Mian et al. | | |
| 7,412,899 B2 | 8/2008 | Mian et al. | | |
| 7,555,954 B2 | 7/2009 | Pagano et al. | | |
| 7,564,569 B2 | 7/2009 | Mian et al. | | |
| 7,602,937 B2 | 10/2009 | Mian et al. | | |
| 7,729,818 B2 * | 6/2010 | Wheeler | ............. | B61L 27/0094 |
| | | | | 701/19 |
| 7,832,281 B2 | 11/2010 | Mian et al. | | |
| 7,899,207 B2 | 3/2011 | Mian et al. | | |
| 8,006,559 B2 | 8/2011 | Mian et al. | | |
| 8,079,274 B2 | 12/2011 | Mian et al. | | |
| 8,111,387 B2 | 2/2012 | Douglas et al. | | |
| 8,140,250 B2 | 3/2012 | Mian et al. | | |
| 8,150,105 B2 | 4/2012 | Mian et al. | | |
| 8,188,430 B2 | 5/2012 | Mian | | |
| 8,209,145 B2 * | 6/2012 | Pagliuco | .................. | B61K 9/08 |
| | | | | 702/158 |
| 8,289,526 B2 | 10/2012 | Kilian et al. | | |
| 8,326,582 B2 | 12/2012 | Mian et al. | | |
| 8,335,606 B2 | 12/2012 | Mian et al. | | |
| 8,400,624 B2 * | 3/2013 | De Sloovere | .......... | G01B 11/25 |
| | | | | 356/139.09 |
| 8,423,240 B2 | 4/2013 | Mian | | |
| 8,478,480 B2 | 7/2013 | Mian et al. | | |
| 8,649,932 B2 | 2/2014 | Mian et al. | | |
| 8,655,540 B2 | 2/2014 | Mian et al. | | |
| 8,700,924 B2 | 4/2014 | Mian et al. | | |
| 8,751,290 B2 * | 6/2014 | Schullian | ............... | G06Q 10/08 |
| | | | | 705/7.35 |
| 8,773,558 B2 * | 7/2014 | Kato | .................. | H01L 27/14627 |
| | | | | 348/294 |
| 8,868,291 B2 | 10/2014 | Mian et al. | | |
| 8,925,873 B2 | 1/2015 | Gamache et al. | | |
| 9,007,688 B2 * | 4/2015 | Vasylyev | ............ | B29D 11/0074 |
| | | | | 359/595 |
| 9,068,503 B2 * | 6/2015 | Kulczyk | ................ | F02B 51/06 |
| 9,121,747 B2 | 9/2015 | Mian et al. | | |
| 9,134,185 B2 | 9/2015 | Mian et al. | | |
| 9,220,441 B2 * | 12/2015 | Yoo | ...................... | G01S 7/52063 |
| 9,233,696 B2 * | 1/2016 | Kumar | ................. | B61L 25/025 |
| 9,296,108 B2 * | 3/2016 | Mian | ..................... | G06K 9/00664 |
| 9,310,340 B2 | 4/2016 | Mian et al. | | |
| 9,340,219 B2 | 5/2016 | Gamache et al. | | |
| 9,415,784 B2 | 8/2016 | Bartonek et al. | | |
| 9,454,816 B2 | 9/2016 | Mian et al. | | |
| 9,518,947 B2 | 12/2016 | Bartonek et al. | | |
| 9,571,796 B2 | 2/2017 | Mian et al. | | |
| 9,663,124 B2 * | 5/2017 | LeFebvre | ................ | B61L 25/021 |
| 9,669,850 B2 * | 6/2017 | Fuchs | ................. | B61L 15/0027 |
| 9,711,046 B2 * | 7/2017 | Shubs, Jr. | ............ | B61L 27/0077 |
| 9,714,043 B2 | 7/2017 | Mian et al. | | |
| 9,825,662 B2 | 11/2017 | Mian et al. | | |
| 9,855,961 B2 * | 1/2018 | West | ....................... | B61L 25/04 |
| 9,922,416 B2 | 3/2018 | Mian et al. | | |
| 9,950,722 B2 * | 4/2018 | Kumar | ................. | B61L 27/0027 |
| 10,054,290 B2 * | 8/2018 | Birdwell | ............. | G02B 6/0008 |
| 10,077,061 B2 * | 9/2018 | Schmidt | ................ | G01B 11/14 |
| 10,136,106 B2 * | 11/2018 | Shubs, Jr. | ........... | H04N 5/23203 |
| 10,196,078 B2 * | 2/2019 | Shubs, Jr. | ........... | B61L 15/0081 |
| 10,197,920 B2 * | 2/2019 | Seong | ................. | G03F 7/70166 |
| 10,259,477 B2 * | 4/2019 | LeFebvre | .............. | B61L 25/025 |
| 10,266,188 B2 * | 4/2019 | Rude | ..................... | B61L 25/028 |
| 10,352,831 B2 | 7/2019 | Kondo et al. | | |
| 2001/0052860 A1 * | 12/2001 | McMaster | ................ | G08G 1/14 |
| | | | | 340/942 |
| 2003/0072001 A1 | 4/2003 | Mian et al. | | |
| 2004/0158154 A1 * | 8/2004 | Hanafy | ............... | G01S 15/8993 |
| | | | | 600/446 |
| 2005/0205719 A1 * | 9/2005 | Hendrickson | ......... | B61L 25/025 |
| | | | | 246/122 R |
| 2006/0231685 A1 | 10/2006 | Mace et al. | | |

(56) References Cited

U.S. PATENT DOCUMENTS

| | | | |
|---|---|---|---|
| 2006/0244907 A1* | 11/2006 | Simmons | G02B 27/46 351/159.26 |
| 2007/0291985 A1* | 12/2007 | Krahnstoever | H04N 7/181 382/103 |
| 2008/0177507 A1 | 7/2008 | Mian et al. | |
| 2012/0192756 A1* | 8/2012 | Miller | B61L 23/048 104/2 |
| 2013/0313372 A1 | 11/2013 | Gamache et al. | |
| 2014/0177656 A1 | 6/2014 | Mian et al. | |
| 2014/0285658 A1 | 9/2014 | Mian | |
| 2014/0333771 A1 | 11/2014 | Mian et al. | |
| 2014/0339374 A1 | 11/2014 | Mian et al. | |
| 2016/0282108 A1 | 9/2016 | Martinod Restrepo et al. | |
| 2016/0321513 A1 | 11/2016 | Mitti et al. | |
| 2016/0325767 A1 | 11/2016 | LeFabvre et al. | |
| 2017/0106887 A1 | 4/2017 | Mian et al. | |
| 2017/0151970 A1* | 6/2017 | Shubs, Jr. | B61L 25/028 |
| 2018/0222504 A1* | 8/2018 | Birch | B61L 23/048 |
| 2018/0319414 A1* | 11/2018 | Lefebvre | B61L 15/0072 |

FOREIGN PATENT DOCUMENTS

| | | |
|---|---|---|
| DE | 19826422 | 9/2002 |
| DE | 19943744 | 1/2006 |
| DE | 19919604 | 8/2009 |
| DE | 102009018036 | 2/2014 |
| DE | 102014119056 | 6/2016 |
| DE | 202016104124 | 11/2016 |
| EP | 1197417 A1 | 4/2002 |
| EP | 1098803 | 1/2003 |
| EP | 1918702 A2 | 5/2008 |
| GB | 2383635 B | 6/2005 |
| JP | 6192717 B2 | 9/2017 |
| WO | 20002757 | 1/2000 |
| WO | 2000/05576 A2 | 2/2000 |
| WO | 2000/08459 | 2/2000 |
| WO | 2000-73118 A1 | 12/2000 |
| WO | 2013/177393 A1 | 11/2013 |
| WO | 2015/165560 | 11/2015 |
| WO | 2016/008201 | 1/2016 |
| WO | 2016/027072 A1 | 2/2016 |

OTHER PUBLICATIONS

European extended search report, European Patent Office (dated Dec. 2, 2020).

Hart et al., "Automated Railcar and Track Inspection Projects: A Review of Collaborations Between CVRL and RailTEC", presentation by Computer Vision and Robotics Laboratory and Railroad Engineering Program (RailTEC) University of Illinois at Urbana-Champaign (2017).

* cited by examiner

BROKEN WHEEL DETECTION SYSTEM

CROSS-REFERENCE(S) TO RELATED APPLICATION(S)

This application is a continuation of and claims priority to nonprovisional U.S. Provisional patent application Ser. No. 16/594,231 invented by Darel Mesher and entitled "Broken Wheel Detection System" which was filed on Oct. 7, 2019 which is a continuation of and claims priority to nonprovisional U.S. Provisional patent application Ser. No. 15/902,465 invented by Darel Mesher and entitled "Broken Wheel Detection System" which was filed on Feb. 22, 2018 which claims priority to U.S. Provisional Patent Application No. 62/461,865 invented by Darel Mesher and entitled "Broken Wheel Detection System" which was filed on Feb. 22, 2017, the entireties of which are incorporated herein by reference.

FIELD

This disclosure relates to the field of transportation safety. More particularly, this disclosure relates to a system for detecting broken wheels on rail vehicles even when such vehicles are moving at a high rate of speed on a track.

BACKGROUND

Worldwide axle/wheel manufacturers produce a diverse variety of railway wheel cross sections for rolling stock currently in service throughout North America. These diverse and varied wheel cross-sections present a significant challenge to any methodology or approach attempting to achieve reliable wheel defect detection.

Numerous examples of defective railway wheels have fragments of various size that have broken away from the wheel tread. Many of these defects are on the outermost edge (field side) of the wheel rim and are not detectable at Wheel Impact and Load Detection sites, commonly referred to as "WILD" sites. The detection of the majority of these defects would require monitoring the field side of each rail.

One of the most challenging aspects of the development of an accurate and reliable broken wheel detection system is the diverse variety of wheels currently in use on railroads throughout North America. Different cross-sections will require sophisticated approaches to ensure that specific locations on the wheel circumference, most susceptible to breakage, are accurately assessed to correctly detect wheel edge defects. Wheel design differences are further exacerbated by the significant age of some wheel designs still in use today. Combined with broad climatic condition operational requirements, dynamic vertical wheel movements typical during testing, elevated wheel speeds, and the requirement for accurate (virtually error free) detection presents a significant challenge for any wheel defect assessment system.

What is needed, therefore, is an accurate, reliable, robust and cost-effective broken wheel detection system that is capable of identifying rolling stock wheel defects continuously at full track speed for any type of wheels with no impact to traffic flows, for all wheels in each train consist.

SUMMARY

The above and other needs are met by an apparatus and method for detecting broken wheels on rail vehicles. Without a-priori dimensional information for each wheel to be inspected, the task of reliable wheel rim defect assessment can be accomplished by determining the consistency of the entire circumference of the wheel rim face. Regardless of wheel cross-section, or wheel tread wear, a consistent wheel face surface ensures the integrity of the wheel rim. In order to accurately assess the integrity of a rail wheel in motion, a broken wheel detector system has been developed which comprises one or more processors, a number of structured light generators, and a number of optically aligned high resolution digital cameras. The light generators and cameras are mounted to rigid frames situated on the field side (outside the rails) of both rails. The processor(s) is also preferably connected to sensors capable of detecting the presence of a moving rail car or locomotive wheel as they approach the wheel assessment system from either direction and Automated Equipment Identification transponders to record car identification information for each car being examined. The system assesses the field side of each train wheel tread face.

In a preferred embodiment, a broken wheel detection apparatus for detecting broken wheels on rail cars while such rail cars are in motion passing by the broken wheel detection apparatus is disclosed, the apparatus comprising a first rail sensor assembly comprising a first structured light generator directed toward a first section of a first rail, and a first digital area scan camera directed to a first wheel assessment zone which includes the first section of the first rail; and a processor in communication with the first rail sensor assembly wherein the processor controls operations of the first structured light generator and the first digital area scan camera, and wherein the processor performs a method for detecting and recording a defect of a wheel on a rail car as such rail car passes by the broken wheel detection apparatus, the method comprising the operations of (a) detecting a passing rail car; (b) obtaining a first plurality of elevation scan frames of a wheel of the rail car using the first digital area scan camera; (c) identifying parallel structured light lines in the first plurality of elevation scan frames; (d) recording positions, lengths and/or orientations of at least some of the structured light lines in each frame of the first plurality of elevation scan frames; and (e) comparing the positions, lengths and/or orientations of the recorded structured light lines in each of the first plurality of elevation scan frames to determine whether all recorded corresponding structured light lines maintains the positions, lengths and/or orientations for each of the first plurality of elevation scan frames. The broken wheel detection apparatus may further comprise a wheel detector in communication with the processor and/or an Automatic Equipment Identification (AEI) device in communication with the processor.

The method performed by the processor may further comprise the operation of recording a defect indication that the wheel of the rail car includes no defects if the positions, lengths and/or orientations of each of the recorded structured light lines in the first plurality of elevation scan frames is determined by the processor to be not different for each elevation scan frame; or recording a defect indication that the wheel of the rail car includes a defect if a position, length or orientation of any of the recorded structured light lines in the first plurality of elevation scan frames is determined by the processor to be different in any of the elevation scan frames from the previously recorded positions, lengths or orientations.

In a related embodiment, the first rail sensor assembly further comprises a second structured light generator directed to a second section of the first rail and a second digital area scan camera directed to a second wheel assessment zone which includes the second section of the first rail, wherein the second structured light generator and the second digital area scan camera are in communication with and controlled by the processor, and the operation of (e) comparing the positions, lengths and/or orientations of the recorded structured light lines in each of the first plurality of elevation scan frames to determine whether all recorded corresponding structured light lines maintain the positions, lengths and/or orientations for each of the first plurality of elevation scan frames comprises the steps of (f) obtaining a second plurality of elevation scan frames of the wheel of the rail car using the second digital area scan camera; (g) identifying parallel structured light lines in the second plurality of elevation scan frames; (h) recording positions, lengths and/or orientations of at least some of the structured light lines in each frame of the second plurality of elevation scan frames; and (i) comparing the positions, lengths and/or orientations of the recorded structured light lines in each of the first plurality of elevation scan frames and the second plurality of elevation scan frames to determine whether all recorded corresponding structured light lines maintain the positions, lengths and/or orientations for each of the first plurality of elevation scan frames and the second plurality of elevation scan frames.

The method performed by the processor may further include the step of recording a defect indication that the wheel of the rail car includes no defects if the positions, lengths and/or orientations of each of the recorded structured light lines in the first plurality of elevation scan frames and the second plurality of elevation scan frames is determined by the processor to be not different for each elevation scan frame; or recording a defect indication that the wheel of the rail car includes a defect if a position, length or orientation of any of the recorded structured light lines in the first plurality of elevation scan frames or the second plurality of elevation scan frames is determined by the processor to be different in any of the elevation scan frames from the previously recorded positions, lengths and/or orientations.

The method performed by the processor may further include the steps of (k) obtaining an identity of a specific rail car on which the wheel of the rail car is mounted using information from the AEI device; (1) obtaining a specific wheel count calculated by the processor; and (m) recording the identity of the specific rail car on which the wheel of the rail car is mounted, the specific wheel count, and the defect indication on the processor to associate such data with the wheel of the rail car.

The broken wheel detection apparatus may further comprise components to assess wheels traveling along a second rail—the opposite side from the first rail. In such embodiments, the same types of components of the broken wheel detection system along the first rail would be mirrored or otherwise located along the opposite side of the track along the second rail. For example, the broken wheel detection system may further comprise a second rail sensor assembly comprising a third structured light generator directed toward a first section of a second rail, and a third digital area scan camera directed to a third wheel assessment zone which includes the first section of the second rail; and the processor in communication with the second rail sensor assembly wherein the processor controls the operations of the third structured light generator and the third digital area scan camera, and wherein the method for detecting and recording a defect of a wheel on a rail car as such rail car passes by the broken wheel detection apparatus further comprises the steps of (1) obtaining a third plurality of elevation scan frames of a second wheel of the rail car using the third digital area scan camera; (2) identifying parallel structured light lines in the third plurality of elevation scan frames; (3) recording positions, lengths and/or orientations of at least some of the structured light lines in each frame of the third plurality of elevation scan frames; and (4) comparing the positions, lengths and/or orientations of the recorded structured light lines in each of the third plurality of elevation scan frames to determine whether all recorded corresponding structured light lines maintain the positions, lengths and/or orientations for each of the third plurality of elevation scan frames. The broken wheel detection apparatus may further comprise a second wheel detector along the second rail in communication with the processor and/or a second Automatic Equipment Identification (AEI) device along the second rail in communication with the processor. The processor could process data gathered from both the first rail and the second rail so that the wheels on both sides of a train can be assessed as the train passes by the broken wheel detection system.

A method for detecting broken wheels on rail cars while such rail cars are in motion is also disclosed, such method including the operations of (a) detecting a rail car in motion before it passes by a broken wheel detection apparatus using a detection device in communication with a processor; (b) projecting structured light lines toward the rail car as it passes by the broken wheel detection apparatus using a light generator in communication with the processor; (c) obtaining a first plurality of elevation scan frames of a wheel of the rail car using a first digital area scan camera in communication with the processor; (d) identifying parallel structured light lines in the first plurality of elevation scan frames using the processor; (e) recording positions, lengths and/or orientations of some of the structured light lines in the first plurality of elevation scan frames; and (f) comparing the position, length and orientation of the recorded structured light lines in each of the first plurality of elevation scan frames using the processor to determine whether all recorded corresponding structured light lines maintain the positions, lengths and/or orientations for each of the first plurality of elevation scan frames.

Operation (a) may further comprise the operations of storing the last elevation scan frame before the wheel of the rail car appears for the first time as one of the elevation scan frames of the first plurality of scan frames so that the stored elevation scan frame can be used as a background frame; and removing any visible features present in the background frame from the first elevation scan frame of the first plurality of elevation scan frames. This allows the processor to only focus on passing wheels and removes extraneous elevation scan imagery.

Operation (c) may further comprise the operation of masking portions of the first plurality of elevation scan frames except for the rim edge of the wheel of the rail car using the processor. This masking operation allows for only the rim of a passing wheel to be assessed, thereby removing extraneous elevation scan imagery from the center of a passing wheel. The operation of masking portions of the first plurality of elevation scan frames except for the rim edge of the wheel of the rail car using the processor may further comprise the operation of identifying three wheel rim regions in the first plurality of elevation scan frames using the processor, such wheel rim regions including a wheel rim left region, a wheel rim right region, and a wheel rim bottom region. Operation (d) identifying parallel structured light lines in the first plurality of elevation scan frames using the processor may further comprise the operation of identifying parallel structured light lines in the wheel rim left region and the wheel rim right region. This may further include identifying parallel structured light lines in the wheel rim bottom region. Operation (e) recording positions, lengths and/or orientations of at least some of the structured light lines in the first plurality of elevation scan frames may further comprise the operation of recording the positions, lengths and/or orientations of each structured light line of the wheel rim right region and the wheel rim left region. Operation (e) may further include recording positions, lengths and/or orientations of each structured light line of the wheel rim bottom region. These operations can be repeated for the second plurality of elevation scan frames as well as scan frames taken from an opposite side of the track Operation (f) may include more operations such that operation (f) actually comprises the operations of (g) obtaining a second plurality of elevation scan frames of the wheel of the rail car using a second digital area scan camera in communication with the processor; (h) identifying parallel structured light lines in the second plurality of elevation scan frames using the processor; (i) recording positions, lengths and/or orientations of at least some of the structured light lines in the second plurality of elevation scan frames; and (j) comparing the positions, lengths and/or orientations of the recorded structured light lines in the first plurality of elevation scan frames and the second plurality of elevation scan frames using the processor to determine whether all recorded corresponding structured light lines maintain the positions, lengths and/or orientations for each of the first plurality of elevation scan frames and the second plurality of elevation scan frames.

The method described above may further include the operation of (k) recording a defect indication that the wheel of the rail car includes no defects if the positions, lengths and/or orientations of each of the recorded structured light lines in the first plurality of elevation scan frames and the second plurality of elevation scan frames is determined by the processor to be not different for each elevation scan frame; or recording on the processor a defect indication that the wheel of the rail car includes a defect if a position, length or orientation of any of the recorded structured light lines in the first plurality of elevation scan frames or the second plurality of elevation scan frames is determined by the processor to be different in any of the elevation scan frames.

The method described above may further include the operations of (l) obtaining the identity of the specific rail car on which the wheel of the rail car is mounted using information from an AEI device in communication with the processor. (m) obtaining the specific wheel count calculated by the processor; and (n) recording the identity of the specific rail car on which the wheel of the rail car is mounted, the specific wheel count, and the defect indication on the processor to associate such data with the wheel of the rail car.

The method described above may further comprise the operation of wirelessly transmitting the recorded data regarding the identity of the specific rail car on which the wheel of the rail car is mounted, the specific wheel count, and the defect indication to be received at a remote location.

All of the method operations described above can be repeated for each wheel of a rail car so that all wheels on a side of a train consist are assessed for detects. Both sides of a train can be assessed in this manner so that all wheels on a rail car can be assessed for defects and the data from such assessment recorded and/or transmitted to a remote location.

The summary provided herein is intended to provide examples of particular disclosed embodiments and is not intended to cover all potential embodiments or combinations of embodiments. Therefore, this summary is not intended to limit the scope of the invention disclosure in any way, a function which is reserved for the appended claims.

BRIEF DESCRIPTION OF THE DRAWINGS

Further features, aspects, and advantages of the present disclosure will become better understood by reference to the following detailed description, appended claims, and accompanying figures, wherein elements are not to scale so as to more clearly show the details, wherein like reference numbers indicate like elements throughout the several views, and wherein:

The figures are provided to illustrate concepts of the invention disclosure and are not intended to embody all potential embodiments of the invention. Therefore, the figures are not intended to limit the scope of the invention disclosure in any way, a function which is reserved for the appended claims.

DETAILED DESCRIPTION

Various terms used herein are intended to have particular meanings. Some of these terms are defined below for the purpose of clarity. The definitions given below are meant to cover all forms of the words being defined (e.g., singular, plural, present tense, past tense). If the definition of any term below diverges from the commonly understood and/or dictionary definition of such term, the definitions below control.

A "processor" is broadly defined herein as a device or group of devices in communication with one another wherein the sum of the various devices can store and process data as well as control other external devices based on one or more sources of data or programming. A processor may include, for example, a processing unit including, for example, one or more microprocessors, an application-specific instruction-set processor, a network processor, a vector processor, a scalar processor, a graphic processor or any combination thereof, or any other control logic apparatus now known or later developed that is capable of performing the tasks described herein, or any combination thereof. A processor as defined herein may further include one or more data storage devices for storing data that is being processed or that has been processed by the processor. A processor as defined herein may further include a transmitter for transmitting data wirelessly to another device.

The phrase "in communication with" means that two or more devices are in communication with one another physically (e.g., by wire) or indirectly (e.g., by wireless communication).

A "rail car" or "rail vehicle" are broadly defined herein as rolling stock (vehicles used on a railroad).

Figure 1:
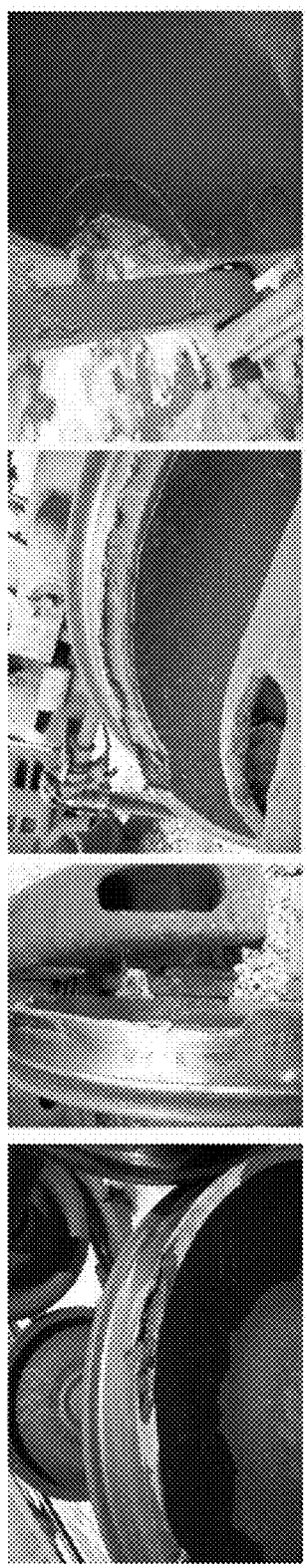
FIG. 1 shows illustrative photographs of broken wheels from a variety of rail vehicles.

FIG. 1 shows images of examples of broken wheels from rail cars. Such wheel defects pose a major threat to any train consist because of the huge impact loads that non-smooth rolling surfaces repeatedly impart on the track rail heads. Under loaded car conditions, these impact loads can break the rails on which they travel and cause train derailments.

Figure 2:
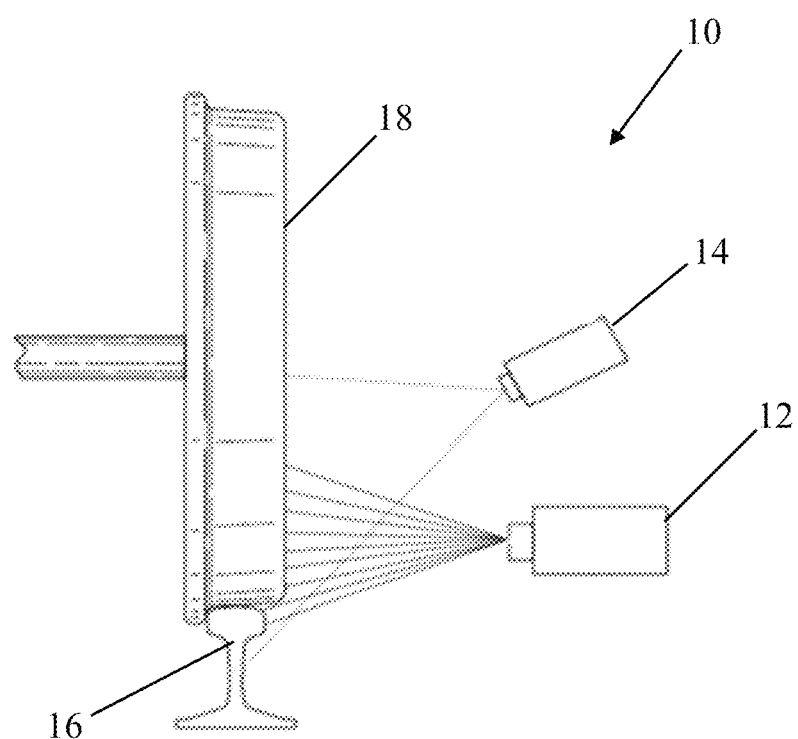
FIG. 2 shows a schematic side view illustrating portions of a broken wheel detection system scanning the field side of a rail vehicle wheel.

Embodiments of the broken wheel detection system described herein such as, for example, broken wheel detection system 10, provide a means to detect broken wheels on rail cars for an entire train, even when such breaks are very small and even when the train being scanned is moving at a high rate of speed. Many of the wheel defects of interest are on the outer field edge of the wheel rim and are not detectable at WILD sites. The detection of the majority of these defects would require monitoring the field side of each rail. Embodiments of the wheel detection system described herein use a three-dimensional (3D) surface elevation measurement and analysis methodology. The proposed methodology advances the concept of conventional laser line draping, digital sensor and photo triangulation thereby producing a single elevation scan measurement to the approach of using a coherent light source in combination with structured light generation optics (a light generator 12), and a digital area scan camera-based sensor (camera 14) to produce parallel elevation measurements over an expansive two-dimensional (2D) surface area, shown as viewed along a rail 16 in FIG. 2. A wheel 18 is shown on the rail 16 and the light generator 12 projects light onto the passing wheel 18 as the digital area scan camera 14 scans a portion of the wheel 18.

Figure 3:
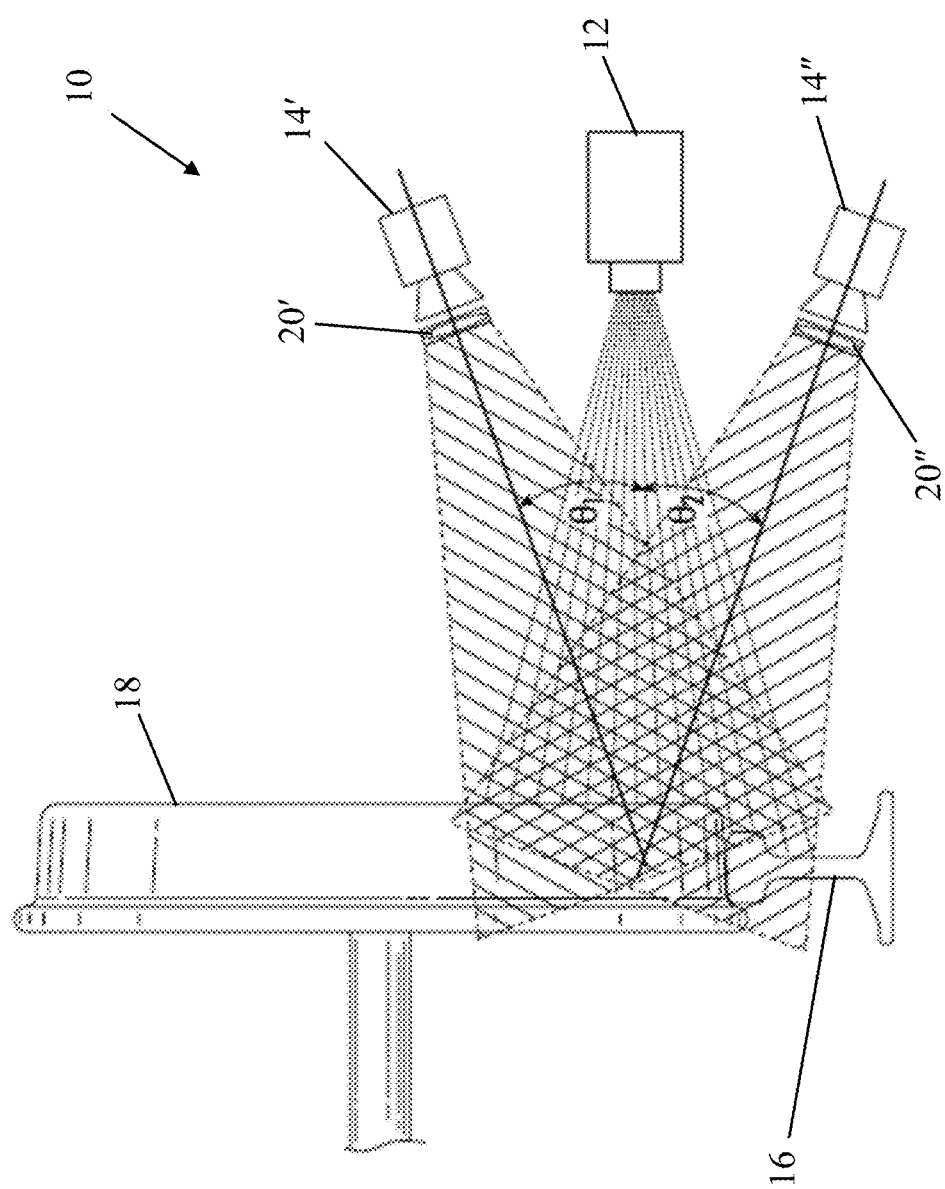
FIG. 3 shows a schematic side view illustrating portions of a broken wheel detection system scanning a rail vehicle wheel.
Figure 4:
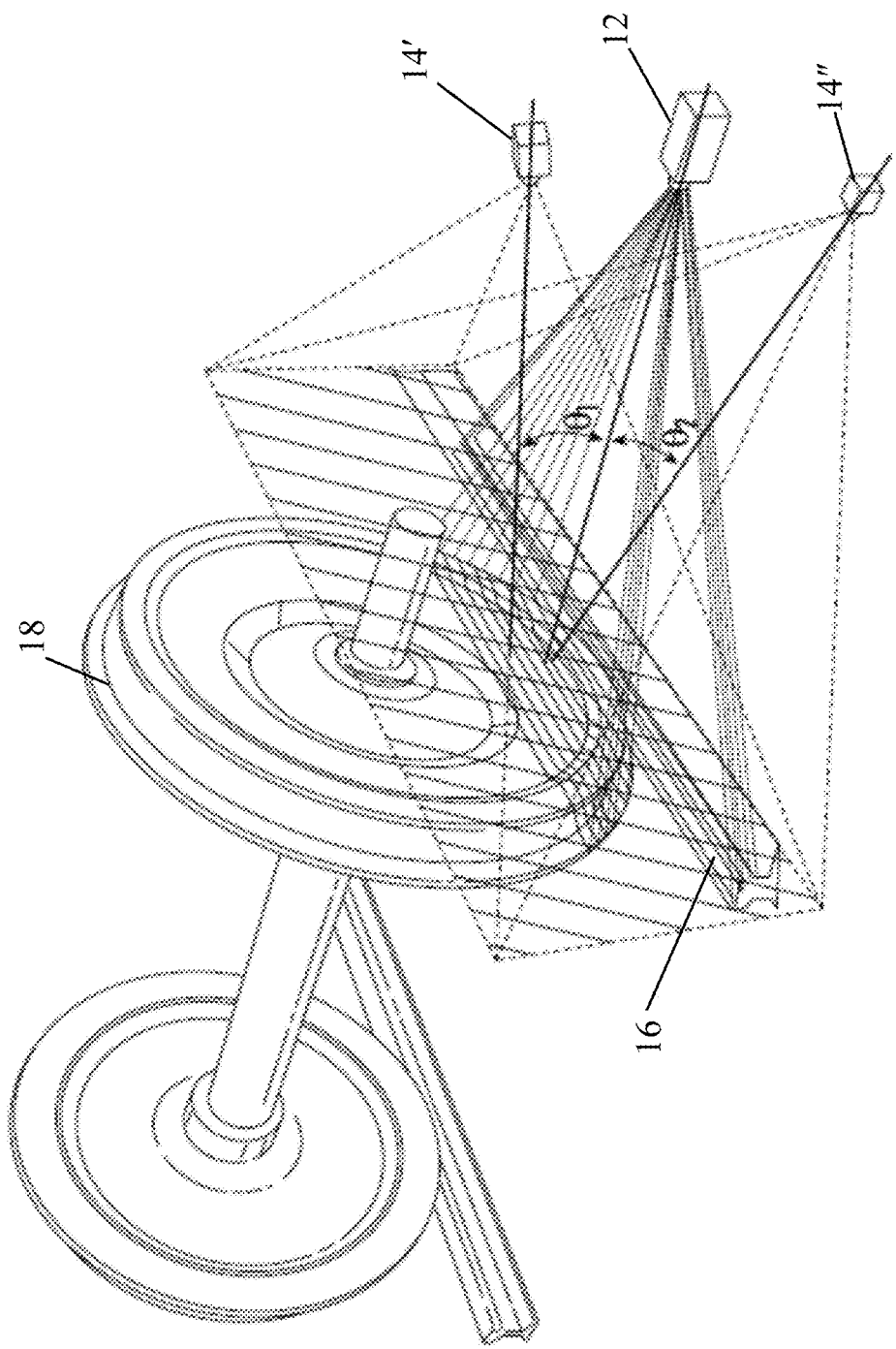
FIG. 4 shows a perspective schematic of portions of the broken wheel detection system from FIG. 3 scanning a rail vehicle wheel.

FIG. 3 shows a preferred embodiment of the broken wheel detection system 10 in which a plurality of cameras including a first upper camera 14' and a first lower camera 14" and coherent light generator 12 are oriented optically (camera optical axis aligned at angles of $\theta_1$ or $\theta_2$ with respect to the structured light axis) either above or below the light source (optimized for the installation and an unobstructed view of each wheel). Cameras 14' and 14" offset from the light generator 12 can produce rim face elevations for the illuminated portion of each wheel using optical triangulation. These elevations are produced simultaneously across each acquired image frame. Variations in wheel rim elevations can be used to detect broken wheel rims or other defects of interest. FIG. 4 shows a perspective schematic view of what is shown in FIG. 3. Parallel structured light lines from the light generator 12 are shown projected on a lower portion of the wheel 18 being interrogated.

In order to enhance the effectiveness of the light pattern detection in ambient light conditions, a narrow band light source is preferably employed, in this case a preferred wavelength of 660 nanometers (nm). Each camera uses a corresponding narrow pass band filter (pass band of 640 nm to 680 nm) including first upper band pass filter 20' and first lower bandpass filter 20".

The structured light from the light generator 12 preferably includes coherent, narrow waveband high intensity parallel horizontal lines 1.5 millimeter (mm) wide, separated by approximately 10-12 mm. Using a structured light source with a horizontal projection angle of 85°-90°, and placing the light source 1.1 to 1.2 m from the wheel face, results in a projected horizontal line width of approximately 2.2 m. Combined with the bandpass filters used for each camera, the resulting images appear monochromatic. The structured light sources are further customized to include dots every 25 mm on each of the even projected light lines to help further differentiate the lines during processing to help characterize and assess unusual wheel rim cross-sections. A preferred structured light generator includes an 80 watt (W) light-emitting diode (LED) source and structured light generation optics producing 25 parallel lines with a nominal wavelength of 660 nm.

Figure 5:
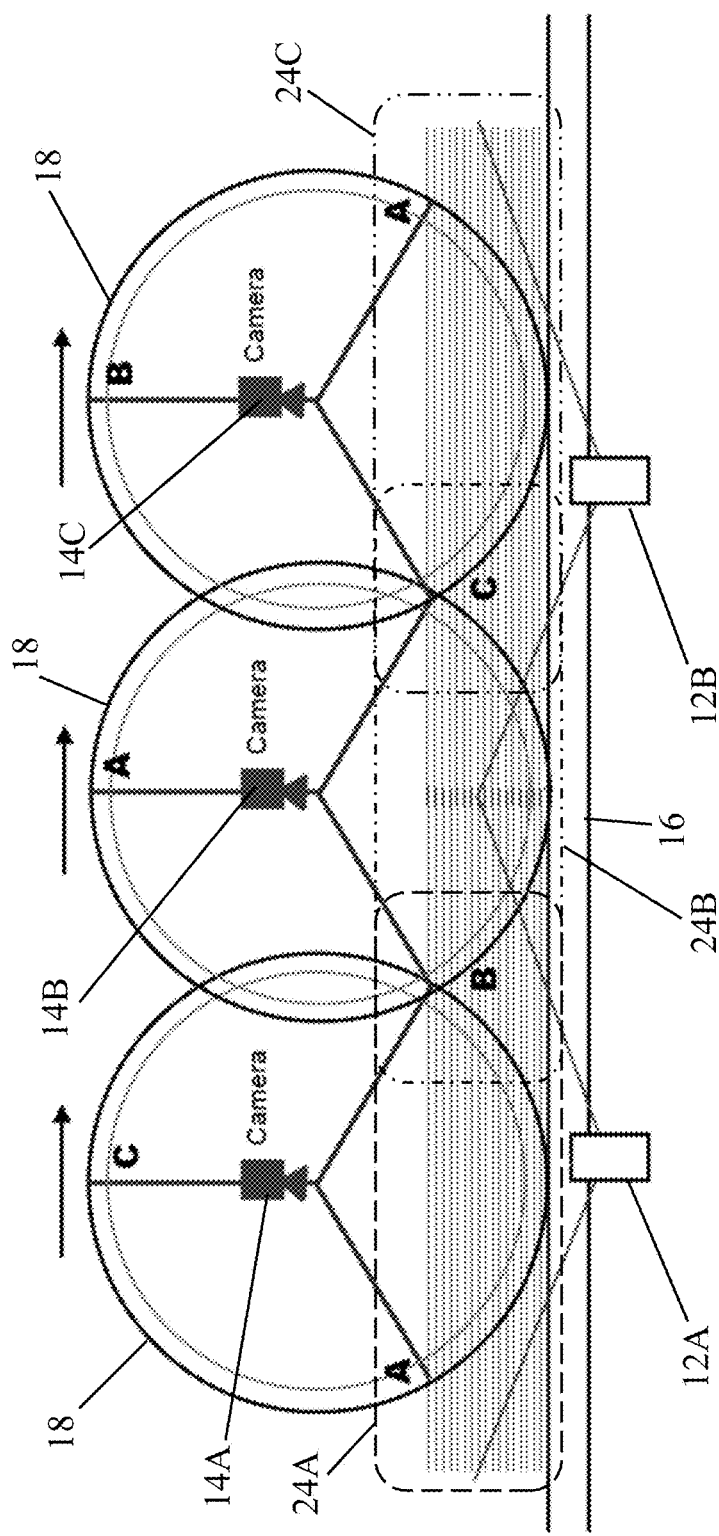
FIG. 5 shows a schematic full rotation broken wheel detection implementation showing how a wheel rotates through multiple wheel assessment zones in front of digital area scan cameras wherein a specified area is lit with a structured light generator.

Given the potential for broken wheel detection sensor placement between parallel multiple track configurations, and stringent climatic performance requirements, one implementation of the broken wheel detection system 10' combines multiple structured laser light generators (including a first light generator 12A and a second light generator 12B—two separate 50+ parallel line generators) with three digital area scan camera-based sensors (including a first digital area scan camera 14A, a second digital area scan camera 14B, and a third digital area scan camera 14C). A full rotation broken wheel detection implementation is shown in FIG. 5. The use of three area scan cameras (14A, 14B, and 14C) and two laser based structured parallel line generators (12A and 12B) ensures that 100% of a wheel edge surface is captured with overlap and redundancy. The structured light illuminated area for the particular broken wheel detection implementation shown in FIG. 5 and FIG. 6 will have total width exceeding 3 m and vertical height dimension of more than 0.250 m. The digital area scan sensors preferably have a pixel density of more than 2000 pixels horizontal and more than 1000 pixels vertical. The structured light geometry in conjunction with the area scan camera pixel density will provide a defect measurement resolution of less than 1 mm horizontal and less than 5 mm vertical. The broken wheel detection system 10' is designed to reliably detect defects smaller than 10 mm×10 mm (less than 0.5 inches×0.5 inches).

Figure 6:
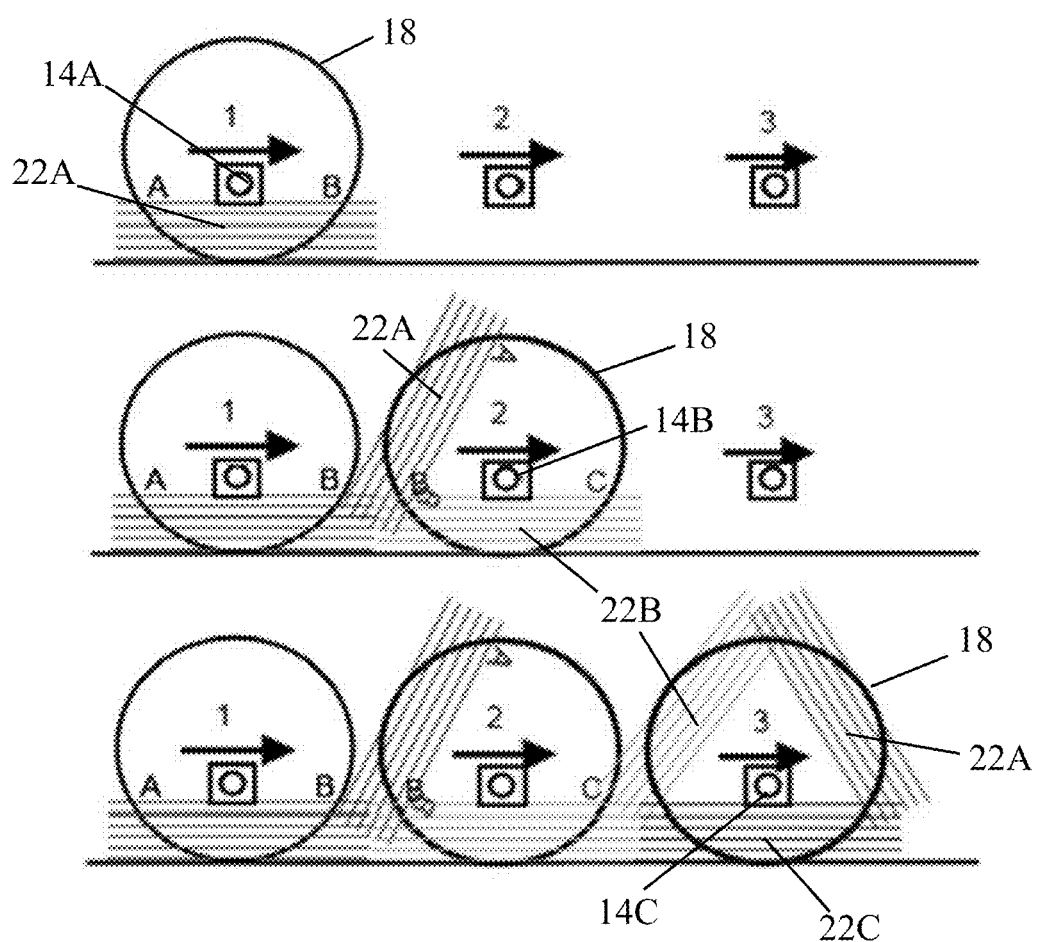
FIG. 6 shows three sequential schematic views stacked on one another illustrating the progress of a wheel through a first wheel assessment zone where a first surface area elevation scan is made, a second wheel assessment zone where a second surface area elevation scan is made, and a third wheel assessment zone where a third surface area elevation scan is made.

A schematic of the corresponding sequence of captured 3D surface elevations areas is depicted in FIG. 5 and FIG. 6. A first surface area elevation scan (shown as parallel lines 22A in FIG. 6) is acquired when a wheel 18, in motion from left to right, is in a first position (shown as "1") in a first wheel assessment zone 24A. At the time of acquisition, the entire area defined below the chord AB in FIG. 5 is acquired by the first area scan camera 14A located at the first position and scanning the first wheel assessment zone 24A. The wheel 18 continues to move to the right by rolling to a second position (shown as "2") in a second wheel assessment zone 24B. A second surface area scan (shown as parallel lines 22B in FIG. 6), defined by the area beneath chord BC in FIG. 5, is acquired by the second area scan camera 14B located at the second position and scanning the second wheel assessment zone 24B. The wheel 18 continues to move to the right by rolling to a third position (shown as "3") in a third wheel assessment zone 24C. A third surface area scan (shown as parallel lines 22C in FIG. 6), defined by the area beneath chord CA in FIG. 5, is acquired by the third area scan camera 14C located at the third position and scanning the third wheel assessment zone 24C. Generally speaking, a wheel assessment zone as used herein is the area at which a particular camera is directed. For example, in FIG. 2 a wheel assessment zone 24 is shown as a rectangular area with angled lines where the cameras 14' and 14" are directed.

Combining each of the surface area scans allows one to construct a complete (or "composite") elevation map (or "scan") for the entire wheel edge face surface area. Once constructed, the wheel edge surface elevations are preferably post-processed and analyzed for elevation consistency. Regardless of actual wheel cross-section, wheels with consistent maximum edge elevations for the entire circumference without any significant elevation deviations represent intact or undamaged wheels.

Using the approach described above, the wheel defect assessments made by the broken wheel detection system 10' are simplified to the analysis of the maximum wheel edge elevation at all points around the wheel circumference of the wheel that is being assessed. This method improves real-time assessment performance by requiring the analysis of very small regions of each composite elevation scan. Wheels edges with surface elevation deviations exceeding pre-defined thresholds are identified as defects and physical characteristics of such defects are reported including, for example and without limitation, wheel identification, percentage of the circumference that is defective, defect length, and defect depth.

An example of the program logic used to detect trigger a report of a defect can be summarized by the equation as follows:

$$WSE_{MAX} - WEE_{LOCAL} > BWET$$

wherein $WSE_{MAX}$ refers to maximum wheel surface elevation, $WEE_{LOCAL}$ refers to localized wheel edge elevation, and BWET refers to broken wheel elevation threshold.

Figure 7:
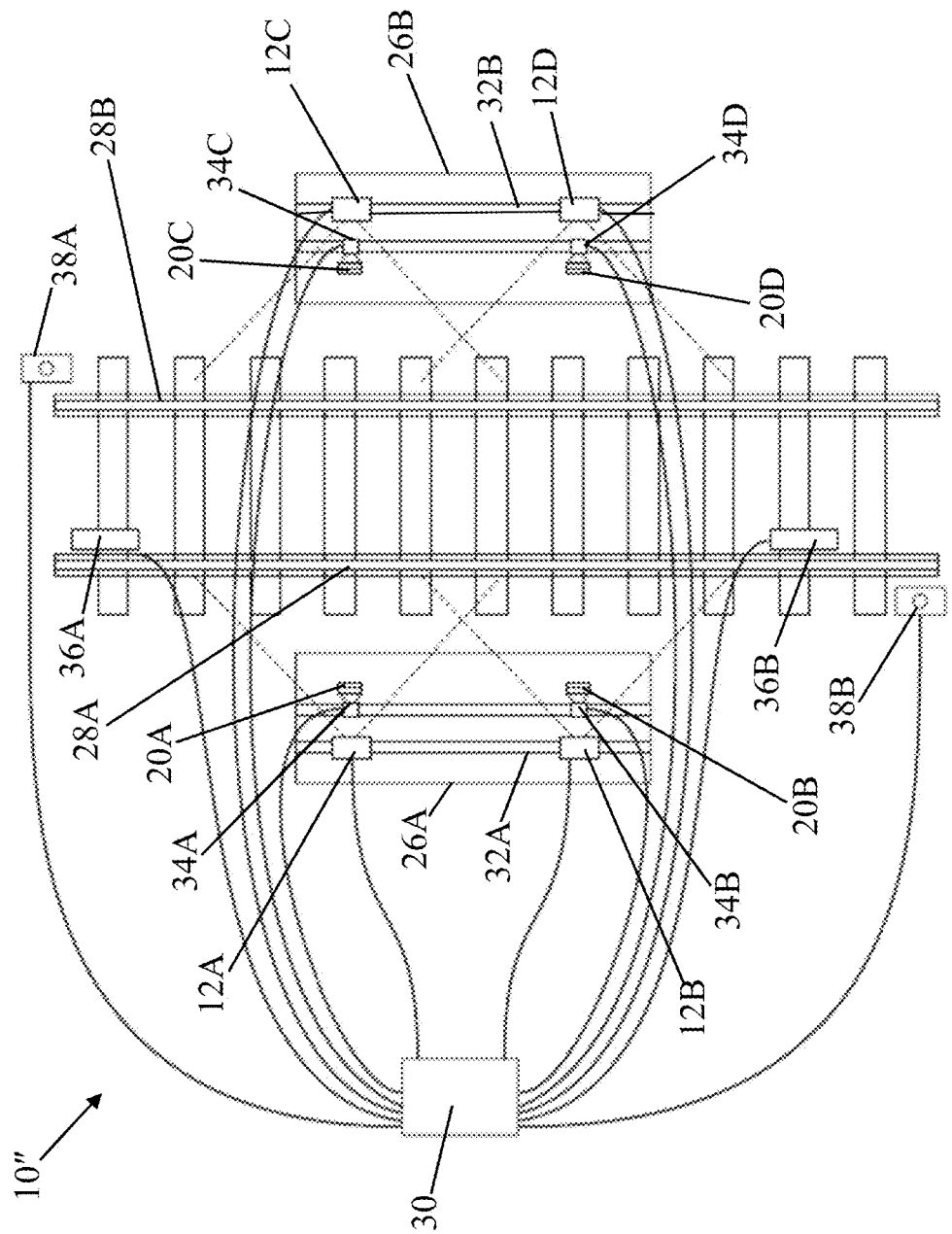
FIG. 7 shows a schematic image of a preferred version of the broken wheel detection system described herein.

A preferred schematic of a broken wheel detection system 10" is shown in FIG. 7. FIG. 7 shows a schematic plan view of a section of railroad track along which the broken wheel detection system 10" is situated. The system 10" includes a first rail sensor assembly 26A directed to a first rail 28A and a second rail sensor assembly 26B directed to a second rail 28B. The first rail sensor assembly 26A includes a first structured light generator 12A in communication with a processor 30 and attached to a first frame 32A, a second structured light generator 12B in communication with the processor 30 and attached to the first frame 32A, a first camera 34A in communication with the processor 30 and attached to the first frame 32A, and a second camera 34B in communication with the processor 30 and attached to the first frame 32A. A first band pass filter 20A is preferably used in conjunction with the first camera 34A and a second band pass filter 20B is preferably used in conjunction with the second camera 34B. Preferably, the system 10" further includes a first train wheel detector 36A for detecting wheels coming from a first direction and a second train wheel detector 36B for detecting wheels coming from a direction opposite the first direction wherein both the first train wheel detector 36A and the second train wheel detector 36B are in communication with the processor 30. The system also preferably includes a first Automatic Equipment Identification (AEI) device 38A along or otherwise adjacent to the first rail 28A and a second AEI device 38B along or otherwise adjacent to the second rail 28B. The first AEI device 38A and the second AEI device 38B are in communication with the processor 30.

The second rail sensor assembly 26B includes a third structured light generator 12C in communication with the processor 30 and attached to a second frame 32B, a fourth structured light generator 12D in communication with the processor 30 and attached to the second frame 32B, a third camera 34C in communication with the processor 30 and attached to the second frame 32B, and a fourth camera 34D in communication with the processor 30 and attached to the second frame 32B. A third band pass filter 20C is preferably used in conjunction with the third camera 34C and a fourth band pass filter 20D is preferably used in conjunction with the fourth camera 34D. The rail sensor assemblies 26 are positioned on the field side of each rail, preferably within 1.3 m of the top of rail. The processor 30 preferably includes or is in communication with a data transmitter that is capable of transmitting data wirelessly from the broken wheel detection system 10" to one or multiple remote data reception devices and locations for further data analysis and/or data archiving.

The use of one or more structured light generators 12 with many parallel lines and the use of area scan cameras 34 over the full illuminated area provides the ability to capture many surface elevations over a significant portion of the face of a wheel at the same instance. For example, a wheel traveling at 70 mph can be scanned approximately ten to twelve times, so that the multiple scans of the same wheel can be compared to each other for breakage along the wheel rim. Using this apparatus and method, the type of wheel passing by the system 10" is irrelevant and does not limit the system's ability to detect wheel breakage. Acquiring and processing the surface elevations for a substantial portion of a wheel face at the same moment simplifies examining the wheel edge surface for anomalies and minimizes interpretation errors associated with diverse cross-sections and vertical wheel motion. An example of a light generator 12 that can be used for the purposes described herein includes coherent light sources manufactured by Salvo-Technologies Inc. based in Largo, Fla. An example of an area scan camera 34 that can be used for the purposes described herein includes Ace cameras manufactured by Basler AG, or Falcon cameras manufactured by Teledyne Dalsa based in Waterloo, Ontario.

Each light generator/camera pair has a typical field of view of 85°-90°. When the light generators 12 and cameras 34 are mounted in the rigid frames 32 and positioned 1.2-1.3 meters (m) from an adjacent rail head to be scanned, this produces a field of view width of approximately 2.2 m. For a standard 36 inch diameter wheel, 2.2 m represents more than 75% of the wheel tread circumference of such a wheel. Dependent on train wheel and camera acquisition speeds, multiple frames are collected for analysis of each passing wheel. Supplementary frames for each wheel are preferably collected from additional light sources and cameras. For the broken wheel detection system 10" shown in FIG. 7, the wheel assessment zone is effectively the entire length covered by the combination of cameras 34.

Collecting image frames continuously as a wheel travels in front of multiple light generator and camera combinations allows assessing the entire tread circumference of each wheel. The resulting sequence of images frames can be analyzed in order to ensure wheel rim elevation consistency. The cameras are operated at high speed to allow capturing sequential high resolution images at train speeds in excess of 70 miles per hour (mph). These sequential frames are acquired at speeds which result in a wheel image for every 0.3 m (1 foot) of lateral motion at 70 mph.

Figure 8:
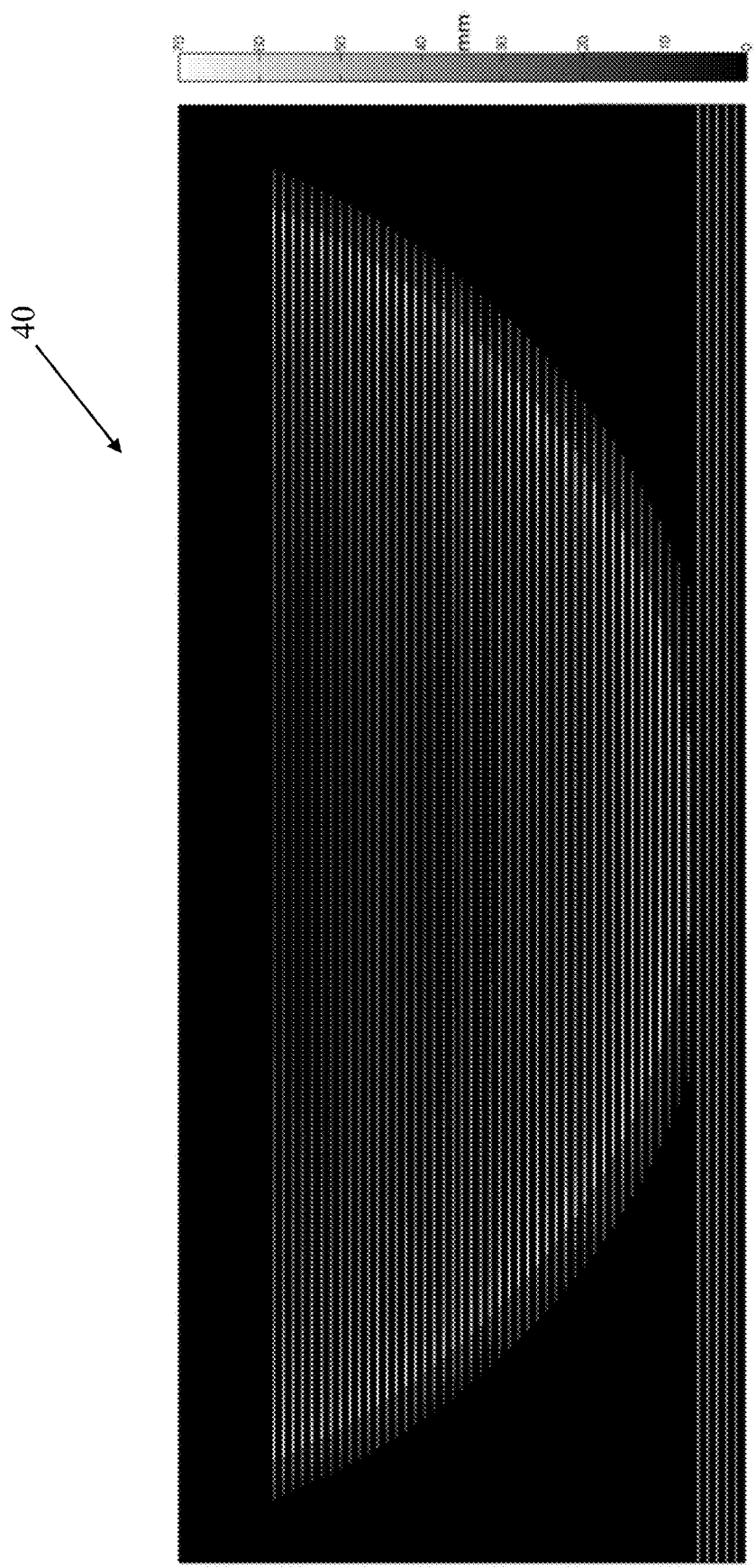
FIG. 8 shows an image of an actual rail wheel surface area elevation scan.

The results of a typical rail wheel surface area elevation scan are shown in FIG. 8. This elevation scan 40 is generated by the use of an area scan camera (e.g., area scan camera 14 or area scan camera 34) and a structured light generator (e.g., the structured light generator 12) which preferably is a 50 parallel line structured light generator. The elevation scan uses shades of gray to depict elevation (Black=0 mm and White=70 mm). The maximum elevation for the illustrative wheel cross-section shown in FIG. 8 is approximately 70 mm.

Figure 9:
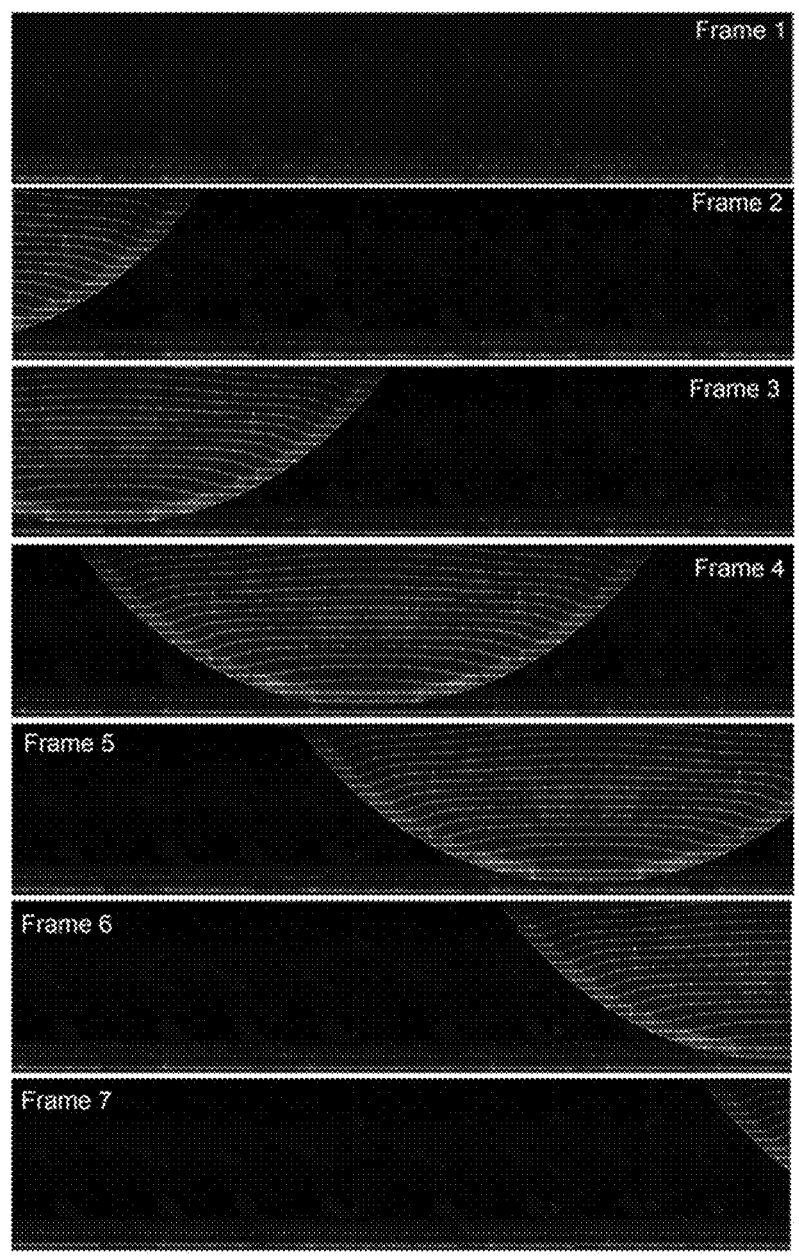
FIG. 9 shows seven frames of surface elevation scans for a single wheel passing by the broken wheel detection system shown in FIG. 7.
Figure 10:
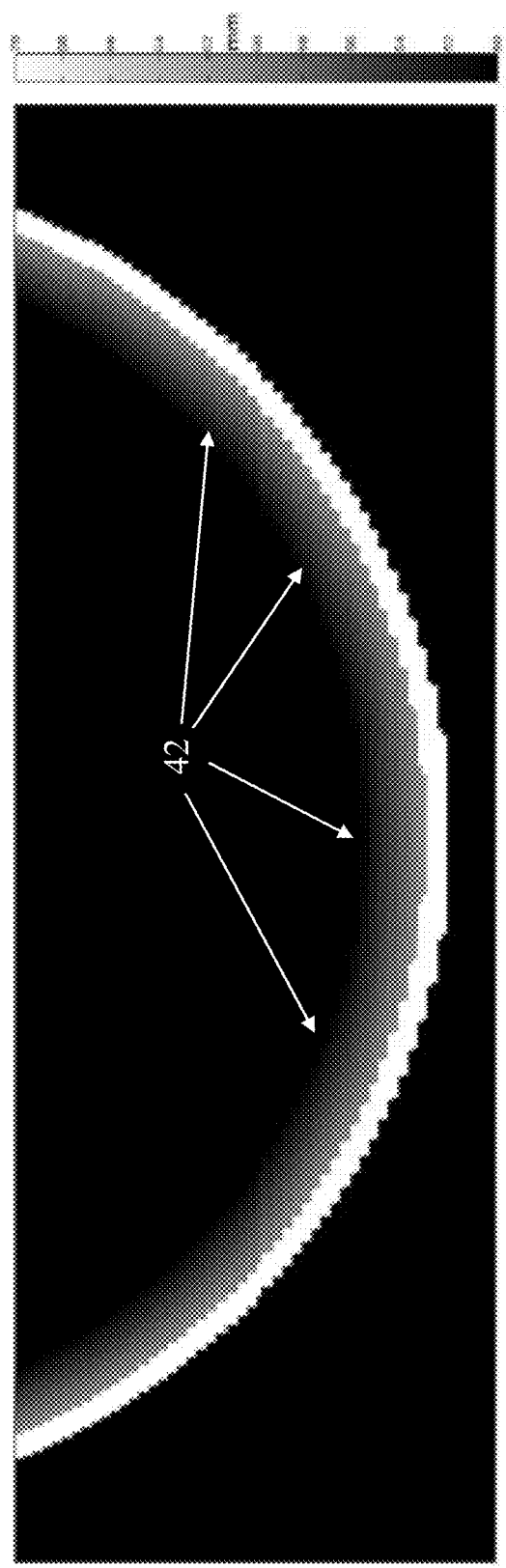
FIG. 10 shows a post-processed area elevation scan wherein a maximum wheel edge elevation zone is shown in the scan.

FIG. 9 shows seven frames of surface elevation scans as a wheel moves past the broken wheel detection system 10". Because multiple frames of the same wheel are acquired as the passing wheel rotates, the various scans can be compared with one another to determine if there are any tread face elevation variations attributed to defects. Also, if any of the frames are obscured by debris or other material, the redundancy of having multiple scans of the same wheel allows for each wheel to still be completely assessed for defects. After each frame is acquired, the processor 30 preferably subtracts the acquired image from a background image (or vice versa) to highlight only the wheel features. The processor 30 then locates or otherwise calculates the wheel rim circumference and applies a wheel rim mask to highlight only the structured light striking the wheel rim edge. In this way a maximum wheel edge elevation zone 42 is isolated by the processor 30. As shown in the post processed example in FIG. 10, the maximum wheel elevation zone 42 is 50 mm to 70 mm elevation range. This allows the processor 30 to detect minute variations in edge maximum elevation representative of defective (broken) wheel rim edge locations.

Regardless of the wheel cross-section, all left and right edge structured line segments at the same vertical position must have identical lengths for all points on the wheel rim edge for an intact wheel without edge defects. The separation of each parallel line must be consistent between consecutive lines (Position P and P+1) as shown for example in FIG. 14A. These consistency requirements are true regardless of the wheel position within the camera field of view. Any variations on the wheel rim face pattern of coherent light (length, position, or orientation) is indicative of abnormalities or defects in the wheel rim edges.

Figure 11:
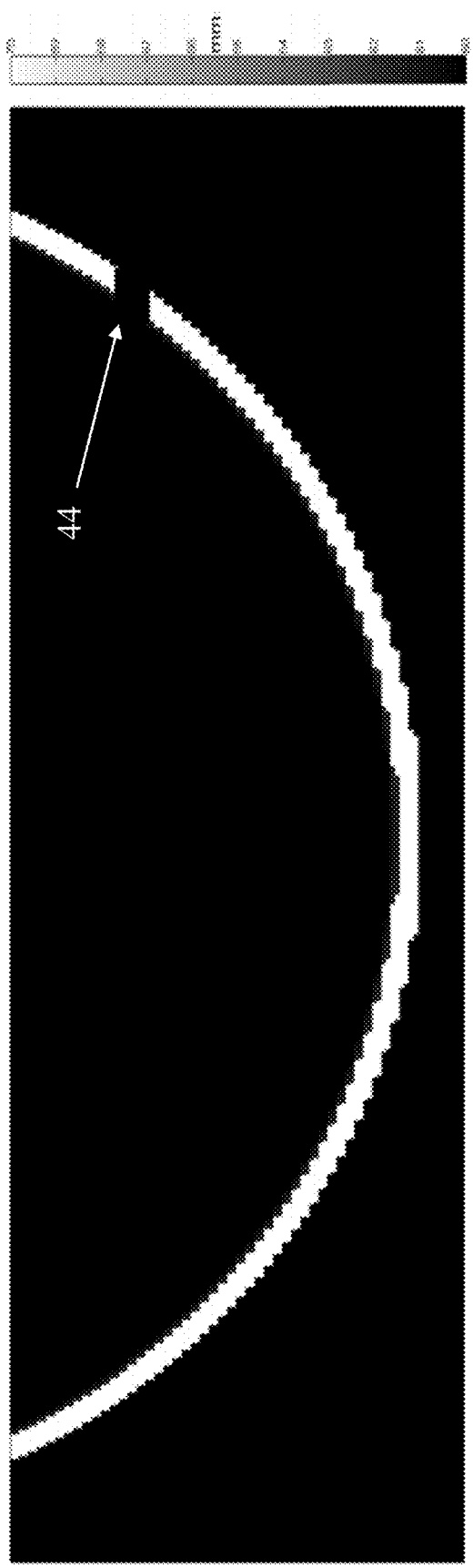
FIG. 11 shows an example of an area elevation scan with a broken wheel edge section shown in the scan.

FIG. 11 depicts an example of an area elevation scan with a broken wheel edge section 44 approximately 20 mm in length and 25 mm in depth. This broken rim edge section 44 represents less than 1% of the circumference of the wheel.

Figure 12:
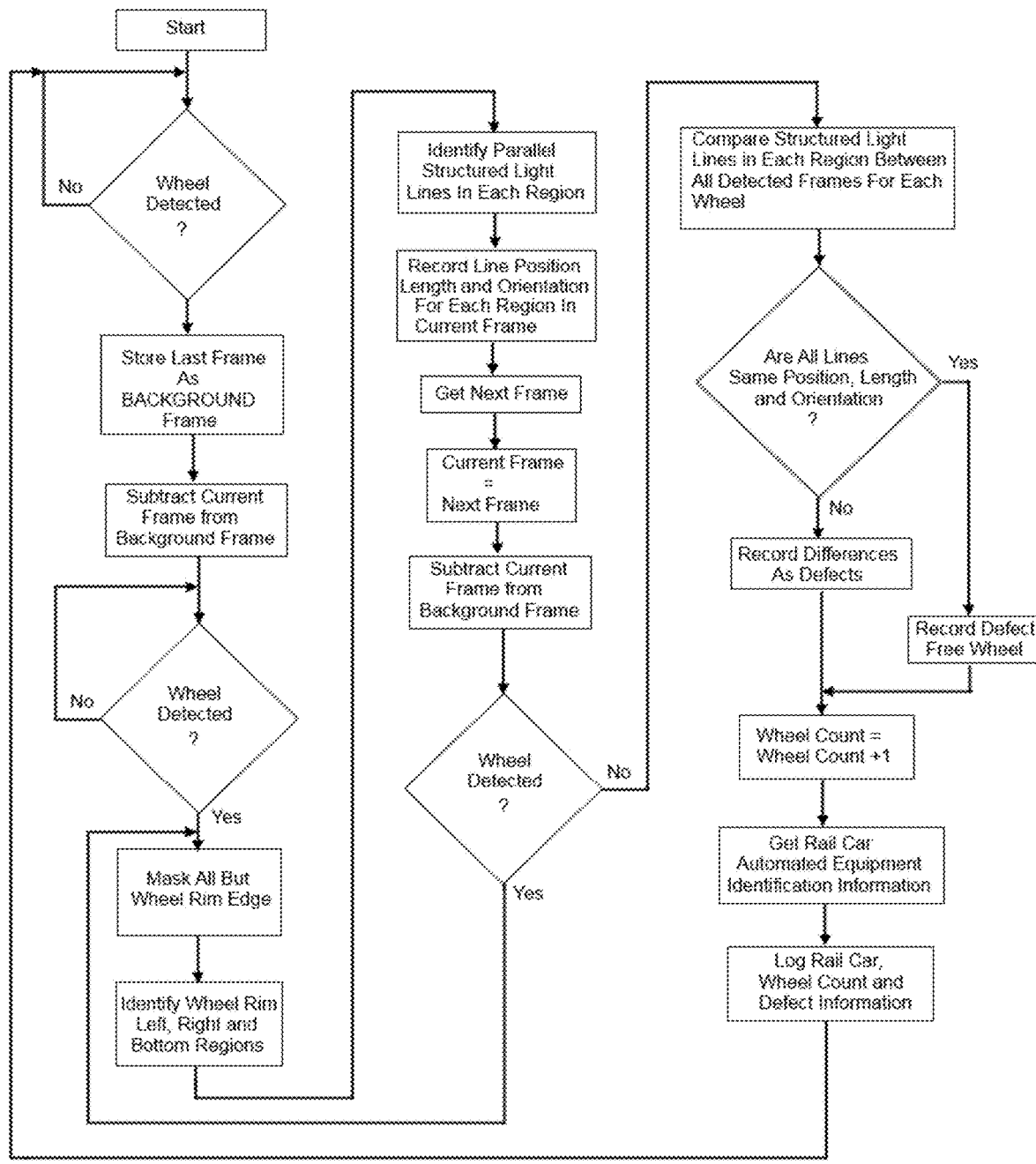
FIG. 12 shows a flowchart showing some of the processing logic used by a processor that forms part of some of the different versions of the broken wheel detection system described herein.
Figure 13:
FIG. 13 shows an area elevation scan in which all portions of the frame are masked except for the wheel rim edge.
Figure 14A:
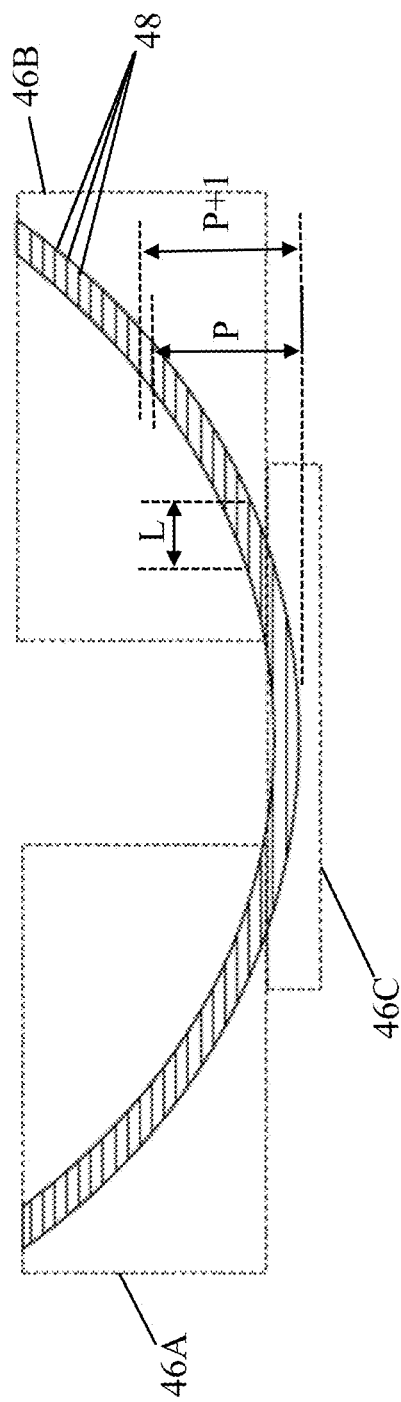
FIG. 14A shows a schematic of an area elevation scan (such as the one shown in FIG. 13) showing multiple identified and defined regions and structured light line segments projected onto a wheel to be measured and processed.
Figure 14B:
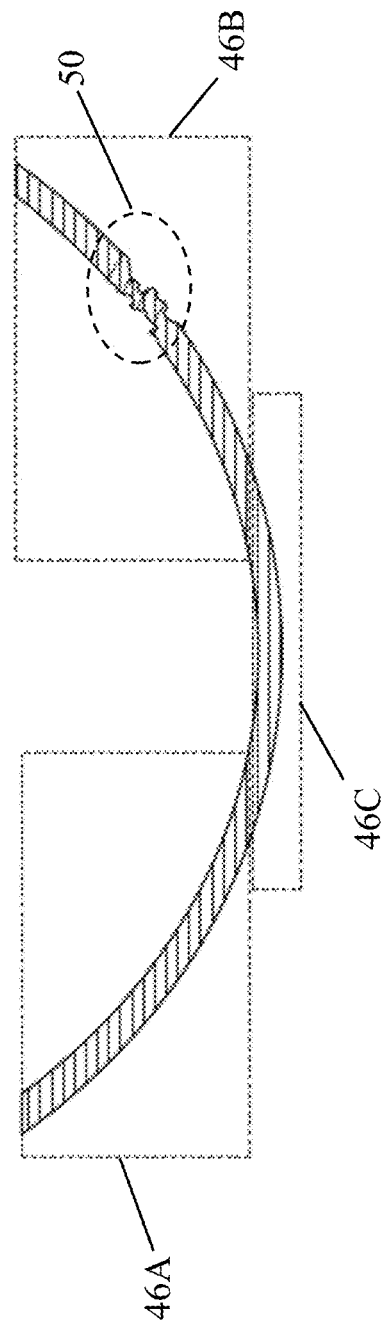
FIG. 14B shows a schematic of an area elevation scan (such as the one shown in FIG. 13) which includes a break in the wheel being scanned.

FIG. 12 shows a flowchart of some of the processing logic method steps used by the processor 30. The first step includes determining whether a wheel is present preferably using the first train wheel detector 36A, the second train wheel detector 36B, or one of the cameras 34. If a wheel is detected, the processor 30 stores the last frame before the wheel came into view as the "Background" frame. The features in the Background frame are subtracted from all subsequent frames showing any part of the passing wheel. In this way, rails, rail heads and other background features are removed from all subsequent frames in which the passing wheel is visible. The size of the passing wheel is preferably calculated by the processor 30 and the processor subsequently places a mask over the inner portion of the passing wheel in each frame except for the wheel rim edge shown in the frame (which is shown, for example, in FIG. 13). The processor 30 then preferably identifies a wheel rim left region 46A, a wheel rim right region 46B, and a wheel rim bottom region 46C as shown for example in FIG. 14A and FIG. 14B. The wheel rim left region 46A and the wheel rim right region 46B are the most important and the wheel rim bottom region 46C is given less consideration or in some cases is discarded. The processor 30 then preferably identifies parallel structured light line segments 48 in each identified region as shown in FIG. 14A and FIG. 14B. Using a data storage device that forms part of the processor 30 or that is in communication with the processor 30, the processor 30 then preferably records line position "P", line length "L" and line orientation for each line segment in each region in the current frame. The processor 30 then preferably moves on to the next frame. After the wheel has passed (based on the detection of the first frame with no wheel), the processor 30 compares recorded corresponding structured light lines 48 in each identified region between all detected frames for the wheel that just passed. The processor 30 determines whether all lines are in the same position, the same length and the same orientation for each frame of the wheel. If all wheel edge elevation measures are equivalent for a particular wheel, the distinct wheel edge elevations are recorded in data storage by the processor and the wheel is recorded as defect free. If, on the other hand, all the wheel edge elevations have significant variations (such as the break 50 shown in FIG. 14B in which the orientation and length of structured light lines has changed), the elevation differences for that particular wheel are recorded in data storage, and the wheel is recorded as defective. For all assessed wheels, the wheel count is maintained by the processor 30 and the identity of the particular rail car and the identity of which side of the rail car is provided to the processor 30 using the first AEI device 38A or the second AEI device 38B. Wheel count and AEI information is preferably recorded by the processor 30 for each wheel and such information is associated with the data relating to each individual wheel. In this way, rail car identification, wheel count information, and wheel defect information can be provided to the proper persons or authorities so that defective wheels can be fixed or replaced before more damage is done to the wheel or track structure over which the defective wheel is traveling. The calculations made by the processor 30 occur in small fractions of a second in order to keep up with the potentially fast pace of a passing train moving at high speed. For example, the calculations for a single wheel as it passes can be done in 0.10 seconds.

The complete combined elevation profile measurements for a particular wheel are quality assurance (QA) processed using the processor 30 before being used for detailed defect analysis and reporting. This QA analysis produces a confidence measure associated with each wheel rim assessment zone. This QA data is recorded and retained using the processor 30 along with the defect analysis and the complete wheel 3D elevation profile made up of 3D elevation information or "maps" from the various frames. Each elevation map section has sufficient overlap with other elevation maps to ensure that all wheel edge areas are assessed in the complete wheel 3D elevation profile. The calculations made by the processor 30 occur in small fractions of a second in order to keep up with the potentially fast pace of a passing train moving at high speed. For example, the calculations for a single wheel as it passes can be done in ⅛ of second.

The minimum automated broken wheel detection system 10" preferred features and advantages include the following:
Detection of defects at wheel speeds from 0 to 70 mph.
False positives error rates of less than 0.01%.
False negatives error rates of less than 0.1%.
Reliable operation in inclement weather.
Reliable operation in the presence of transient obscuring events (weeds, trash, or other debris).
Defect detection results must be completed within two minutes of the final wheel being assessed.
Reliable operation over a temperature range of −50 to 60° C.
Reliable operation regardless of vertical track movement.
Automatic train sense and system activation/operation.
Use of Automatic Equipment Identification (AEI) to associate axle defects with car and position.
Radio communication interface.
Storage capabilities for 7 days of complete defect assessment data for audit purposes.
Internet based defect assessment result reporting capabilities.

Another advantage includes the use of a large number of parallel lines separated by only 10-12 mm over a wide field of view which allows many simultaneous 3D rim edge elevation measurements over a significant portion of each passing wheel regardless of wheel speed, wheel rim cross-section or dynamic vertical wheel motion which would be detrimental to single horizontal line triangulation-based elevation measurements.

The foregoing description of preferred embodiments of the present disclosure has been presented for purposes of illustration and description. The described preferred embodiments are not intended to be exhaustive or to limit the scope of the disclosure to the precise form(s) disclosed. Obvious modifications or variations are possible in light of the above teachings. The embodiments are chosen and described in an effort to provide the best illustrations of the principles of the disclosure and its practical application, and to thereby enable one of ordinary skill in the art to utilize the concepts revealed in the disclosure in various embodiments and with various modifications as are suited to the particular use contemplated. All such modifications and variations are within the scope of the disclosure as determined by the appended claims when interpreted in accordance with the breadth to which they are fairly, legally, and equitably entitled.

What is claimed is:

1. A broken wheel detection apparatus for detecting broken wheels on rail cars while a rail car is in motion passing by the broken wheel detection apparatus, the broken wheel detection apparatus comprising:
   a first rail sensor assembly located alongside a railroad track comprising a first structured light generator directed toward a first section of a first rail, and a first digital area scan camera directed to a first wheel assessment zone which includes the first section of the first rail;
   a second rail sensor assembly located alongside a railroad track comprising a second structured light generator directed toward a first section of a second rail, and a second digital area scan camera directed to a second wheel assessment zone which includes the first section of the second rail; and
   a processor in communication with the first rail sensor assembly and the second rail sensor assembly wherein the processor controls operations of the first structured light generator, the second structured light generator, the first digital area scan camera, and the second digital area scan camera, and wherein the processor performs a method for detecting and recording a defect of a wheel on a rail car as such rail car passes by the broken wheel detection apparatus, the method comprising operations of:
   a. obtaining a first plurality of elevation scan frames of a first wheel of a passing rail car using the first digital area scan camera wherein the first wheel is traveling on the first rail;
   b. identifying parallel structured light lines in the first plurality of elevation scan frames;
   c. recording positions, lengths, or orientations of at least some of the parallel structured light lines in each frame of the first plurality of elevation scan frames;
   d. comparing the positions, lengths, or orientations of the recorded parallel structured light lines in each elevation scan frame of the first plurality of elevation scan frames to determine whether all recorded corresponding structured light lines maintain the positions, lengths, or orientations for each elevation scan frame of the first plurality of elevation scan frames;
   e. obtaining a second plurality of elevation scan frames of a second wheel of a passing rail car using the second digital area scan camera wherein the second wheel is traveling on the second rail;
   f. identifying parallel structured light lines in the second plurality of elevation scan frames;
   g. recording positions, lengths, or orientations of at least some of the parallel structured light lines in each frame of the second plurality of elevation scan frames; and
   h. comparing the positions, lengths, or orientations of the recorded parallel structured light lines in each elevation scan frame of the second plurality of elevation scan frames to determine whether all recorded corresponding structured light lines maintain the positions, lengths, or orientations for each elevation scan frame of the second plurality of elevation scan frames.

2. The broken wheel detection apparatus of claim 1 further comprising a wheel detector in communication with the processor.

3. The broken wheel detection apparatus of claim 1 further comprising an Automatic Equipment Identification (AEI) device in communication with the processor.

4. The broken wheel detection apparatus of claim 1 wherein the method for detecting and recording a defect of a wheel on a rail car as such rail car passes by the broken wheel detection apparatus further comprises an operation of:
   e. recording a defect indication that the first wheel or the second wheel of the rail car includes no defects if the positions, lengths, or orientations of each of the recorded structured light lines in the first plurality of elevation scan frames or the second plurality of elevation scan frames is determined by the processor to be not different for each elevation scan frame; or recording a defect indication that the first wheel or the second wheel of the rail car includes a defect if a position, lengths, or orientation of any of the recorded structured light lines in the first plurality of elevation scan frames or the second plurality of elevation scan frames is determined by the processor to be different in any of the elevation scan frames from the positions, lengths or orientations recorded in operation c. or g.

5. The broken wheel detection apparatus of claim 3 wherein the method for detecting and recording a defect of a wheel on a rail car as such rail car passes by the broken wheel detection apparatus further comprises operations of:
   i. obtaining an identity of a specific rail car on which the first wheel and the second wheel of the rail car are mounted using information from the AEI device;
   j. obtaining a specific wheel count calculated by the processor; and
   k. recording the identity of the specific rail car on which the first wheel and the second wheel of the rail car are mounted, the specific wheel count, and a defect indication on the processor to associate such data with the first wheel or the second wheel of the rail car.

6. A method for detecting broken wheels on rail cars while a rail car is in motion, which comprises operations of,
   a. projecting structured light lines toward a rail car as it passes by a broken wheel detection apparatus located alongside a railroad track using a first light generator and a second light generator in communication with a processor;
   b. obtaining a first plurality of elevation scan frames of a first wheel of the rail car using a first digital area scan camera in communication with the processor wherein the first wheel is traveling along a first rail;
   c. identifying parallel structured light lines in the first plurality of elevation scan frames using the processor;
   d. recording positions, lengths or orientations of at least some of the parallel structured light lines in the first plurality of elevation scan frames;
   e. obtaining a second plurality of elevation scan frames of a second wheel of the rail car using a second digital area scan camera in communication with the processor wherein the second wheel is traveling along a second rail;
   f. identifying parallel structured light lines in the second plurality of elevation scan frames using the processor;
   g. recording positions, lengths or orientations of at least some of the parallel structured light lines in the second plurality of elevation scan frames; and
   h. comparing the positions, lengths or orientations of the recorded parallel structured light lines in each elevation scan frame of the first plurality of elevation scan frames and the second plurality of elevation scan frames using the processor to determine whether all recorded corresponding structured light lines maintain the positions, lengths, or orientations for each elevation scan frame of the first plurality of elevation scan frames and the second plurality of elevation scan frames.

7. The method of claim 6 further comprising an operation of,
   i. recording a defect indication that the first wheel or the second wheel of the rail car includes no defects if the positions, lengths, or orientations of each of the recorded structured light lines in the first plurality of elevation scan frames and the second plurality of elevation scan frames is determined by the processor to be not different for each elevation scan frame; or recording a defect indication that the first wheel or the second wheel of the rail car includes a defect if a position, length, or orientation of any of the recorded structured light lines in the first plurality of elevation scan frames or the second plurality of elevation scan frames is determined by the processor to be different in any of the elevation scan frames from the positions, lengths or orientations recorded in operations d. and g.

8. The method of claim 7 further comprising operations of:
   j. obtaining an identity of a specific rail car on which the wheel of the rail car is mounted using information from an AEI device in communication with the processor,
   k. obtaining a specific wheel count calculated by the processor; and
   l. recording the identity of the specific rail car on which the wheel of the rail car is mounted, the specific wheel count, and the defect indication on the processor to associate such data with the wheel of the rail car.

9. The method of claim 6 wherein the operation of b. obtaining a first plurality of elevation scan frames of a first wheel of the rail car using a first digital area scan camera in communication with the processor further comprises an operation of masking portions of the first plurality of elevation scan frames except for a rim edge of the first wheel of the rail car using the processor.

10. The method of claim 9 wherein the operation of masking portions of the first plurality of elevation scan frames except for the rim edge of the first wheel of the rail car using the processor further comprises an operation of identifying three wheel rim regions in the first plurality of elevation scan frames using the processor, such wheel rim regions including a wheel rim left region, a wheel rim right region, and a wheel rim bottom region.

11. The method of claim 10 wherein the operation of identifying parallel structured light lines in the first plurality of elevation scan frames using the processor further comprises an operation of identifying parallel structured light lines in the wheel rim left region and the wheel rim right region; and wherein the operation of recording the positions, lengths, or orientations of some of the structured light lines in the first plurality of elevation scan frames further comprises an operation of recording the position, length, or orientation of each structured light line for the wheel rim right region and the wheel rim left region.

12. The method of claim 11 further comprising an operation of wirelessly transmitting recorded data regarding an identity of a specific rail car on which the first wheel and the second wheel of the rail car are mounted, a specific wheel count, and a defect indication to be received at a remote location.

13. The method of claim 9 further comprising operations of detecting a rail car in motion before it passes by a broken wheel detection apparatus using a detection device in communication with a processor; storing a last elevation scan frame before the first wheel of the rail car appears for a first time as one of the elevation scan frames of the first plurality of scan frames so that the stored elevation scan frame can be used as a background frame; and removing any visible features present in the background frame from the first elevation scan frame of the first plurality of elevation scan frames.

14. The method of claim 8 wherein the method further comprises repeating operations a. through l. as additional wheels pass by the broken wheel detection apparatus.

* * * * *